United States Patent [19]

Sifferman

[11] 4,418,755

[45] Dec. 6, 1983

[54] METHODS OF INHIBITING THE FLOW OF WATER IN SUBTERRANEAN FORMATIONS

[75] Inventor: Thomas R. Sifferman, Ponca City, Okla.

[73] Assignee: Conoco Inc., Ponca City, Okla.

[21] Appl. No.: 293,746

[22] Filed: Aug. 17, 1981

Related U.S. Application Data

[63] Continuation of Ser. No. 121,551, Feb. 14, 1979, abandoned.

[51] Int. Cl.³ .............................................. E21B 33/138
[52] U.S. Cl. ..................................... 166/281; 166/294
[58] Field of Search ............... 166/294, 295, 275, 281, 166/282, 283; 252/8.55 R; 175/65, 72

[56] References Cited

U.S. PATENT DOCUMENTS

| | | | |
|---|---|---|---|
| 2,034,347 | 3/1936 | Loomis et al. | 166/294 |
| 2,121,036 | 6/1938 | Irons | 166/294 |
| 2,143,991 | 1/1939 | Loomis | 166/294 |
| 2,270,006 | 1/1942 | Kennedy | 166/294 |
| 2,781,850 | 2/1957 | Nowak et al. | 166/295 |
| 2,867,278 | 1/1959 | Mallory et al. | 166/295 |
| 3,749,174 | 7/1973 | Friedman et al. | 166/294 |

FOREIGN PATENT DOCUMENTS 245945  7/1963  Australia ............................ 166/294

*Primary Examiner*—Stephen J. Novosad
*Attorney, Agent, or Firm*—A. Joe Reinert

[57] ABSTRACT

Methods of inhibiting the flow of water into and from subterranean well formations wherein one or more gelling agents having the property of forming highly viscous gels in the presence of water are injected into the formation.

16 Claims, No Drawings

METHODS OF INHIBITING THE FLOW OF WATER IN SUBTERRANEAN FORMATIONS

This is a continuation of application Ser. No. 121,551 filed Feb. 14, 1979, now abandoned.

BACKGROUND OF THE INVENTION

1. Field of the Invention

This invention relates to treating subterranean formations penetrated by well bores for the purpose of reducing the production of undesirable water from the formations or reducing the loss of aqueous treating fluids to the formations.

2. Description of the Prior Art

In drilling, completing and producing subterranean formations penetrated by well bores, the in-flow or out-flow of water to and from water-bearing or water permeable formations penetrated by the well bores is often undesirable. For example, in producing oil and/or gas from subterranean formations which also contain water, the production of water along with the oil and/or gas is undesirable in that the produced water forms an undesirable emulsion with oil which can plug or otherwise interfere with efficient operation of surface separation and storage equipment and which requires special treating equipment to break the emulsion and recover oil therefrom. In addition, the produced water must be disposed of which adds to the expense of producing the wells. In instances where the well bore penetrates water-bearing formations as well as formations containing desired fluids such as oil and/or gas, the same problem exists.

In drilling, treating and completing oil and/or gas wells, highly permeable formations penetrated by the well bore often cause problems in that water from drilling muds, treating fluids such as formation fracturing fluids, acidizing fluids, packer fluids, etc., and cement slurries enter the permeable formations reducing the water content of the fluids or preventing all or part of the fluids from reaching the desired zone or formation whereby the effectiveness of the fluids is lost or reduced.

A variety of methods, compositions and means have been heretofore developed and used for plugging or sealing water-bearing or water permeable formations. For example, bulky solid materials, resinous materials and various gelatinous compounds, cement compositions and the like have been utilized heretofore for plugging subterranean formations to prevent the in-flow and out-flow of water and other fluids into and from the formations. However, such methods and compositions are generally expensive to carry out and/or are only temporarily effective. Further, such methods and compositions are generally ineffective in preventing the production of water from subterranean formations containing both water and desired fluids such as oil and/or gas.

Methods employing chemical compositions for inhibiting the flow of water in subterranean formations have been developed and used heretofore. For example, U.S. Pat. No. 3,604,508 to Marion O. Son, Jr. teaches the selective water shut-off of highly permeable subterranean formations wherein a micellar dispersion comprised of hydrocarbons, surface active agents and an aqueous medium is injected into the formation. The micellar dispersion takes up water to form a highly viscous dispersion which blocks the formation from intrusion of fluids.

U.S. Pat. No. 3,330,351 to George G. Bernard teaches a method of selectively reducing the flow of a particular fluid-producing formation into a well bore by injecting a solution containing a surface active agent into the formation followed by injecting a gas therein whereby a foam is formed in the formation adjacent the well bore which shuts off or blocks the influx of water therefrom into the well bore.

U.S. Pat. No. 3,495,664 to John Kelly, Jr. teaches shutting off water from water-producing formations in a pneumatically drilled well bore by introducing an oil wetting surface active agent and a non-volatile hydrophobic liquid into contact with the water-producing formation.

By the present invention improved methods of inhibiting the flow of water from a subterranean formation containing desired fluids such as oil and/or gas in addition to containing water are provided which are economical to carry out and which inhibit the production of water while allowing the production of oil and/or gas from the formation. The methods of the present invention can also be effectively utilized to inhibit the flow of fluids into permeable formations penetrated by a well bore as well as inhibiting the flow of water from water-bearing formations penetrated by a well bore.

SUMMARY OF THE INVENTION

Methods of inhibiting the flow of water in subterranean formations are provided comprising introducing a gelling agent into the formations having the property of forming a highly viscous gel in the presence of water.

It is, therefore, a general object of this invention to provide methods of inhibiting the flow of water in subterranean formations.

Another object of the present invention is the provision of methods of plugging or shutting off the production of water from subterranean water zones or water-bearing formations by in situ chemical means.

A further object of the present invention is the provision of methods of inhibiting the flow of water to and from subterranean formations which are effective and economical to carry out.

Other objects, features and advantages of this invention will be readily apparent to those skilled in the art upon a reading of the description of preferred embodiments which follows.

DESCRIPTION OF PREFERRED EMBODIMENTS

The production of water with oil and/or gas from subterranean formations penetrated by a well bore is a common problem encountered in the oil industry. The water may be produced from a water-bearing formation or zone adjacent the oil and/or gas-bearing formation or zone, or the producing formation may contain both hydrocarbons and water. In the drilling and completing of well bores penetrating subterranean formations, water-bearing or water permeable formations also often cause problems. For example, when a water-bearing formation is encountered in the drilling of a well bore whereby large quantities of water are produced into the well bore, the drilling operations are interrupted and it is necessary to plug the water-bearing formation before drilling operations can be recommenced. When formations are encountered which are highly permeable, drilling mud and other treating fluids are lost into the highly permeable formations again interrupting operations or at least adversely affecting such operations.

In accordance with the present invention, one or more gelling agents having the property of forming a highly viscous gel in the presence of water are introduced or injected into a formation whereby water existing in the formation or water subsequently entering the formation reacts with the gelling agent to form a gel and inhibit the flow of water to or from the formation. In the case where a formation produces both water and oil, one or more gelling agents are introduced therein which react with water to plug or inhibit the flow of water from the portions or strata producing water but do not appreciably interfere with the oil producing strata.

The term "gelling agent" is used herein to mean surface active agents or mixtures of surface active agents which form highly viscous gels in the presence of water. Examples of surface active agents falling within the foregoing definition which are suitable for use in accordance with this invention are as follows:

| General Type of Surfactant | CTFA[1] Designation | Other Designation[2] | Structural Formula |
|---|---|---|---|
| Ethoxylated Aliphatic | PEG-10 Stearamine | | $CH_3(CH_2)_{16}CH_2-N \begin{cases} (CH_2CH_2O)_xH \\ (CH_2CH_2O)_yH \end{cases}$ where $x + y$ has an average value of 10 |
| Ethoxylated Aliphatic | PEG-5 Cocamine | | $R-N \begin{cases} (CH_2CH_2O)_xH \\ (CH_2CH_2O)_yH \end{cases}$ where R represents the coconut radial and $x + y$ has an average value of 5 |
| Ethoxylated Aliphatic | PEG-10 Oleate | | $CH_3(CH_2)_7CH=CH(CH_2)_7\overset{O}{\underset{\|}{C}}-(OCH_2CH_2)_nOH$ where n has an average value of 10 |
| Ethoxylated Alcohols | | ALFONIC® 1412-40 | $CH_3(CH_2)_xCH_2(OCH_2CH_2)_nOH$ where x has a value in the range of from 10 to 12 and n has an average value of 3 |
| Ethoxylated Alcohols | | ALFONIC® 610-50 | $CH_3(CH_2)_xCH_2(OCH_2CH_2)_nOH$ where x has a value in the range of from 4 to 8 and n has an average value of 3 |
| Ethoxylated Alcohols | | ALFONIC® 1012-60 | $CH_3(CH_2)_xCH_2(OCH_2CH_2)_nOH$ where x has a value in the range of from 8 to 10 and n has an average value of 5.7 |
| Ammonium Lauryl Sulfate | Ammonium Lauryl Sulfate | | $CH_3(CH_2)_{10}CH_2OSO_3NH_4$ |
| Sodium Lauryl Sulfate | Sodium Lauryl Sulfate | | $CH_3(CH_2)_{10}CH_2OSO_3Na$ |
| Amido Betaine | Coca-Betaine | | $R-\overset{CH_3}{\underset{CH_3}{\overset{\|}{\underset{\|}{N^+}}}}-CH_2COO^-$ |
| Amido Betaine | Lauryl Betaine | | $CH_3(CH_2)_{10}CH_2-\overset{CH_3}{\underset{CH_3}{\overset{\|}{\underset{\|}{N^+}}}}-CH_2COO^-$ |
| Amino Amine Oxide | Cocamidopropylamine oxide | | $R\overset{O}{\underset{\|}{C}}-NH-(CH_2)_3-\overset{CH_3}{\underset{CH_3}{\overset{\|}{\underset{\|}{N}}}}\longrightarrow O$ where $R\overset{O}{\underset{\|}{C}}$ represents the coconut acid radical |
| Polyoxyethylene | Oleth-10 | | $CH_3(CH_2)_7CH=CH(CH_2)_7CH_2(OCH_2CH_2)_nOH$ |

| General Type of Surfactant | CTFA[1] Designation | Other Designation[2] | Structural Formula |
|---|---|---|---|
| Oleyl Ether | | | where n has an average value of 10 |
| Polyoxyethylene Fatty Glyceride | PEG-25 Hydrogenated Castor Oil | | A polyethylene glycol derivative of hydrogenated castor oil with an average of 25 moles of ethylene oxide. |
| Polyoxyethylene 20 Sorbitan Monolaurate | Polysorbate 20 | | $HO(CH_2CH_2O)_w$ $(OCH_2CH_2)_xOH$ $CH—(OCH_2CH_2)_yOH$ $CH_2—(OCH_2CH_2)_zO—\overset{O}{\overset{\parallel}{C}}(CH_2)_{10}CH_3$ where w + x + y + z has an average value of 20 |
| Polyoxyethylene 20 Sorbitan Monooleate | Polysorbate 80 | | $HO(CH_2CH_2O)_w$ $(OCH_2CH_2)_xOH$ $CH—(OCH_2CH_2)_yOH$ $CH_2—(OCH_2CH_2)_zO—\overset{O}{\overset{\parallel}{C}}(CH_2)_7CH=CH(CH_2)_7CH_3$ where w + x + y + z has an average value of 20 |
| Sulfated Ethoxylated Alcohol | | ALFONIC® 1412-S 1412-A | $[CH_3(CH_2)_xCH_2(OCH_2CH_2)_nOSO_3]M$ where x has a value in the range of from 10 to 12, n has a value of 3 and M is ammonium or sodium |

[1]Cosmetic, Toiletry and Fragrance Association (CFTA) Cosmetic Ingredient Dictionary
[2]Conoco Chemicals Co., a Division of Continental Oil Company.

Generally, ethoxylated surface active agents give the best results and are preferred for use in accordance with this invention. The most preferred gelling agents for use in accordance with this invention are polyoxyethylene oleyl ether, polyoxyethylene 20 sorbitan monooleate, and polyoxyethylene fatty glyceride which increase in viscosity in the presence of water but reduce in viscosity in the presence of oil. Of these, polyoxyethylene oleyl ether is the most preferred.

In carrying out the methods of this invention, the surface active agent or agents utilized are injected into the formation or formations in which the flow of water is to be inhibited in a sufficient quantity. If the formation contains water, the surface active agent or agents react with the water to form a highly viscous gel which functions to plug the formation and inhibit the flow of water thereinto or therefrom. If the formation does not contain water, the injection of the surface active agent or agents can be followed by a quantity of water sufficient to react with the surface active agent or agents whereby a gel is formed. Generally, a water-surface active agent or agents mixture in the formation whereby water is present in an amount in the range of from about 50% by volume of the mixture to about 75% by volume of the mixture is required to form the highly viscous gel. Once formed, the gel will remain indefinitely in the formation so long as water is present therein. If it is desired to remove the gel from the formation, the formation can be treated with a strong acid or base, depending upon the particular gelling agent used to break the gel.

A variety of techniques can be utilized for injecting the gelling agent or agents used into a formation. A particularly convenient technique is to dilute the gelling agent or agents used with a quantity of water whereby the viscosity of the mixture is increased, but the mixture is still pumpable. The mixture is then displaced through the well bore and into the formation to be treated using conventional techniques with a pumpable fluid which is immiscible with water and in which the gelling agent or agents used are insoluble. Examples of such fluids are liquid hydrocarbons such as crude oil, diesel oil, kerosene, etc., liquid glycols and natural oils such as cottonseed oil.

In order to facilitate a clear understanding of the methods of the present invention the following examples are given.

EXAMPLE 1

In the laboratory, the viscosities of 100% ALFONIC® 1412-S surface active agent, a mixture of such surface active agent and synthetic sea water containing 25% by volume water, a mixture of such surface active agent and synthetic sea water containing 50% by volume water and a mixture of such surface active agent and synthetic sea water containing 75% by volume water are measured on a Brookfield Model LVT viscometer using the spindle and rpms given in Table I below at room temperature. The synthetic sea water used is as follows:

Synthetic* Sea Salt

| Component | % By Weight |
|---|---|
| NaCl | 58.490 |
| MgCl.6H$_2$O | 26.460 |
| NaSO$_4$ | 9.750 |
| CaCl$_2$ | 2.765 |
| KCl | 1.645 |
| NaHCO$_3$ | .477 |
| KBr | .238 |
| H$_3$BO$_4$ | .071 |
| SiCl$_2$.6H$_2$O | .095 |
| NaF | .007 |

*Mixture composition based on ASTM D 1141-75 "Substitute Ocean Water." Five and one-half ounces of "SEA SALT" is added to one gallon of deionized water.

The results of these tests are given in Table I below.

The viscosity measurements given in Table I are apparent viscosities in units of consistency approximately equal to centipoises.

TABLE I

VISCOSITIES OF VARIOUS ALFONIC ® 1412-S - SYNTHETIC SEA WATER MIXTURES

| Mixture Containing 25% by Volume Water | | | Mixture Containing 50% by Volume Water | | | Mixture Containing 75% by Volume Water | | | 100% Surface Active Agent | | |
|---|---|---|---|---|---|---|---|---|---|---|---|
| Spindle No. | RPM | Viscosity, cp | Spindle No. | RPM | Viscosity, cp | Spindle No. | RPM | Viscosity, cp | Spindle No. | RPM | Viscosity, cp |
| 4 | 6 | — | 4 | 60 | 300 | 3 | 60 | 40 | 3 | 6 | 100 |
| 4 | 13 | 32,000 | 4 | 30 | 340 | 3 | 30 | 56 | 3 | 12 | 100 |
| 4 | 1.5 | 49,600 | 4 | 12 | 550 | 3 | 12 | 90 | 3 | 20 | 100 |
| 4 | 0.6 | 78,000 | 4 | 6 | 400 | 3 | 6 | 100 | 3 | 60 | 100 |
| 4 | 0.3 | 116,000 | 3 | 6 | 440 | | | | | | |
| | | | 3 | 12 | 360 | | | | | | |
| | | | 3 | 30 | 280 | | | | | | |
| | | | 3 | 60 | 310 | | | | | | |

From Table I it can be seen that ALFONIC ® 1412-S surface active agent increases in viscosity with small amounts of water, but decreases in viscosity with higher amounts of water.

EXAMPLE 2

The procedure of Example 1 is repeated using ALFONIC ® 1412-S surface active agent and various quantities of No. 1 Supre diesel oil instead of synthetic sea water. The results of these tests are given in Table II below.

TABLE II

VISCOSITIES OF VARIOUS ALFONIC ® 1412-S - DIESEL OIL MIXTURES

| Mixture Containing 25% by Volume Diesel Oil | | | Mixture Containing 50% by Volume Diesel Oil | | | Mixture Containing 75% by Volume Diesel Oil | | | 100% Surface Active Agent | | |
|---|---|---|---|---|---|---|---|---|---|---|---|
| Spindle No. | RPM | Viscosity, cp | Spindle No. | RPM | Viscosity, cp | Spindle No. | RPM | Viscosity, cp | Spindle No. | RPM | Viscosity, cp |
| 3 | 60 | 1,038 | 3 | 60 | 60 | 3 | 60 | 30 | 3 | 60 | 100 |
| 3 | 30 | 1,560 | 3 | 30 | 60 | 3 | 30 | 32 | 3 | 30 | 100 |
| 3 | 12 | 2,750 | 3 | 12 | 60 | 3 | 12 | 50 | 3 | 12 | 100 |
| 3 | 6 | 4,300 | 3 | 6 | 60 | 3 | 6 | 60 | 3 | 6 | 100 |
| 3 | 3 | 6,800 | | | | | | | | | |
| 3 | 1.5 | 11,200 | | | | | | | | | |
| 3 | 0.6 | 20,000 | | | | | | | | | |
| 3 | 0.3 | 30,000 | | | | | | | | | |

From Table II it can be seen that the surface active agent increases in viscosity when mixed with small amounts of diesel oil.

EXAMPLE 3

The procedure of Example 1 is repeated using Oleth-10 surface active agent and synthetic sea water. The results of these tests are given in Table III below.

TABLE III

VISCOSITIES OF VARIOUS OLETH-10 - SYNTHETIC SEA WATER MIXTURES

| Mixture Containing 25% by Volume Water | | | Mixture Containing 50% by Volume Water | | | Mixture Containing 75% by Volume Water | | | 100% Surface Active Agent | | |
|---|---|---|---|---|---|---|---|---|---|---|---|
| Spindle No. | RPM | Viscosity, cp | Spindle No. | RPM | Viscosity, cp | Spindle No. | RPM | Viscosity, cp | Spindle No. | RPM | Viscosity, cp |
| 4 | 60 | 4,950 | 4 | 3 | — | 4 | 60 | 520 | 3 | 60 | 190 |
| 4 | 30 | 6,900 | 4 | 1.5 | — | 4 | 30 | 600 | 3 | 30 | 196 |
| 4 | 12 | 12,000 | 4 | 0.6 | 820,000 | 4 | 12 | 600 | 3 | 12 | 200 |
| 4 | 6 | 19,000 | 4 | 0.3 | 1,200,000 | 4 | 6 | 600 | 3 | 6 | 180 |

From Table III it can be seen that Oleth-10 surfactant increases in viscosity greatly in the presence of synthetic sea water up to over 50% by volume water.

EXAMPLE 4

The procedure of Example 2 is repeated except that No. 1 Super diesel oil is substituted for the synthetic sea water. The results of these tests are given in Table IV below.

TABLE IV

VISCOSITIES OF VARIOUS OLETH-10 - DIESEL OIL MIXTURES

| Mixture Containing 25% by Volume Diesel Oil | | | Mixture Containing 50% by Volume Diesel Oil | | | Mixture Containing Diesel Oil and Synthetic Sea Water[1] | | | 100% Surface Active Agent | | |
|---|---|---|---|---|---|---|---|---|---|---|---|
| Spindle No. | RPM | Viscosity, cp | Spindle No. | RPM | Viscosity, cp | Spindle No. | RPM | Viscosity, cp | Spindle No. | RPM | Viscosity, cp |
| 3 | 60 | 90 | 3 | 60 | 40 | 4 | 1.5 | — | 3 | 60 | 200 |
| 3 | 30 | 100 | 3 | 30 | 36 | 4 | 0.6 | 150,000 | 3 | 30 | 200 |
| 3 | 12 | 100 | 3 | 12 | 40 | 4 | 0.3 | 200,000 | 3 | 12 | 200 |
| 3 | 6 | 100 | | | | | | | 3 | 6 | 240 |
| | | | | | | | | | 3 | 3 | 240 |
| | | | | | | | | | 3 | 1.5 | 240 |

[1]Surfactant combined with ⅓ by volume No. 1 Super diesel oil and ⅓ by volume synthetic sea water.

From Table IV it can be seen that Oleth-10 surfactant reduces in viscosity in the presence of oil. In the presence of a 50% mixture of diesel oil and synthetic sea water the viscosity increases, but such viscosity is appreciably lower than the viscosity shown in Table III for mixtures of Oleth-10 and sea water.

EXAMPLE 5

The procedure of Example 1 is repeated using Polysorbate 80 surface active agent and synthetic sea water. The results of these tests are shown in Table V below.

TABLE V

VISCOSITIES OF VARIOUS POLYSORBATE 80 - SYNTHETIC SEA WATER MIXTURES

| Mixture Containing 25% by Volume Water | | | Mixture Containing 50% by Volume Water | | | Mixture Containing 75% by Volume Water | | | 100% Surface Active Agent | | |
|---|---|---|---|---|---|---|---|---|---|---|---|
| Spindle No. | RPM | Viscosity, cp | Spindle No. | RPM | Viscosity, cp | Spindle No. | RPM | Viscosity, cp | Spindle No. | RPM | Viscosity, cp |
| 3 | 60 | 2,140 | 3 | 0.6 | — | 4 | 6 | 120 | 3 | 60 | 550 |
| 3 | 30 | 2,200 | 3 | 0.3 | 392,000 | 4 | 30 | 160 | 3 | 30 | 560 |
| 3 | 12 | 2,200 | 4 | 0.3 | 490,000 | 3 | 60 | 60 | 3 | 12 | 550 |
| 3 | 6 | 2,200 | 4 | 0.6 | 330,000 | 3 | 30 | 68 | 3 | 6 | 500 |
| 3 | 3 | 2,400 | 4 | 1.5 | 196,000 | 3 | 12 | 60 | | | |
| 3 | 1.5 | 2,200 | 4 | 3 | 135,000 | 3 | 6 | 60 | | | |
| 3 | 0.6 | — | 4 | 6 | — | | | | | | |

From Table V it can be seen that Polysorbate 80 surfactant in the presence of sea water achieves high viscosity up to about 50% by volume of water.

EXAMPLE 6

The procedure of Example 5 is repeated except that No. 1 Super diesel oil is substituted for the synthetic sea water. The results of these tests are shown in Table VI below.

TABLE VI

VISCOSITIES OF VARIOUS POLYSORBATE 80 - DIESEL OIL MIXTURES

| Mixture Containing 25% by Volume Diesel Oil | | | Mixture Containing 50% by Volume Diesel Oil | | | Mixture Containing Diesel Oil and Synthetic Sea Water | | | 100% Surface Active Agent | | |
|---|---|---|---|---|---|---|---|---|---|---|---|
| Spindle No. | RPM | Viscosity, cp | Spindle No. | RPM | Viscosity, cp | Spindle No. | RPM | Viscosity, cp | Spindle No. | RPM | Viscosity, cp |
| 3 | 60 | 136 | 3 | 60 | 22 | 3 | 60 | 400 | 3 | 60 | 560 |
| 3 | 30 | 192 | 3 | 30 | 28 | 3 | 30 | 400 | 3 | 30 | 560 |
| 3 | 12 | 300 | 3 | 12 | 20 | 3 | 12 | 430 | 3 | 12 | 560 |
| 3 | 6 | 320 | | | | 3 | 6 | 420 | 3 | 6 | 520 |
| 3 | 3 | 400 | | | | 3 | 3 | 440 | 3 | 3 | 520 |
| | | | | | | 3 | 1.5 | 400 | | | |

From Table VI it can be seen that the viscosity of Polysorbate 80 reduces appreciably in the presence of oil as compared to the high viscosities attained in the presence of water.

EXAMPLE 7

The procedure of Example 1 is repeated using Polysorbate 20 surface active agent. The results of these tests are shown in Table VII below.

TABLE VII

VISCOSITIES OF POLYSORBATE 20 - SYNTHETIC SEA WATER MIXTURES

| Mixture Containing 25% by Volume Water | | | Mixture Containing 50% by Volume Water | | | Mixture Containing 75% by Volume Water | | | 100% Surface Active Agent | | |
|---|---|---|---|---|---|---|---|---|---|---|---|
| Spindle No. | RPM | Viscosity, cp | Spindle No. | RPM | Viscosity, cp | Spindle No. | RPM | Viscosity, cp | Spindle No. | RPM | Viscosity, cp |
| 3 | 60 | 390 | 3 | 60 | 120 | 3 | 60 | 22 | 3 | 60 | 430 |
| 3 | 30 | 400 | 3 | 30 | 144 | 3 | 30 | 24 | 3 | 30 | 440 |
| 3 | 12 | 400 | 3 | 12 | 150 | 3 | 12 | 20 | 3 | 12 | 420 |
| 3 | 6 | 400 | 3 | 6 | 220 | 3 | 6 | 0 | 3 | 6 | 420 |

From Table VII it can be seen that Polysorbate 20 surface active agent does not increase in viscosity in the presence of synthetic sea water.

EXAMPLE 8

The procedure of Example 1 is repeated using PEG-25 hydrogenated castor oil surface active agent. The results of these tests are given in Table VIII below.

TABLE VIII

VISCOSITIES OF PEG-25 HYDROGENATED CASTOR OIL - SYNTHETIC SEA WATER MIXTURES

| Mixture Containing 25% by Volume Water | | | Mixture Containing 50% by Volume Water | | | Mixture Containing 75% by Volume Water | | | 100% Surface Active Agent | | |
|---|---|---|---|---|---|---|---|---|---|---|---|
| Spindle No. | RPM | Viscosity, cp | Spindle No. | RPM | Viscosity, cp | Spindle No. | RPM | Viscosity, cp | Spindle No. | RPM | Viscosity, cp |
| 4 | 6 | — | 4 | 60 | 8,500 | 3 | 60 | 24 | 3 | 60 | — |
| 4 | 3 | 134,000 | 4 | 30 | 10,400 | 3 | 30 | 24 | 3 | 30 | 2,540 |
| 4 | 1.5 | 208,000 | 4 | 12 | 12,500 | 3 | 12 | 20 | 3 | 12 | 2,850 |
| 4 | 0.6 | 380,000 | 4 | 6 | 14,500 | 3 | 6 | 0 | 3 | 6 | 2,900 |
| 4 | 0.3 | 550,000 | 4 | 3 | 14,000 | | | | | | |
| | | | 4 | 1.5 | 26,000 | | | | | | |
| | | | 4 | 0.6 | 41,000 | | | | | | |
| | | | 4 | 0.3 | 60,000 | | | | | | |

From Table VIII it can be seen that PEG-25 hydrogenated castor oil surface active agent increases in viscosity in the presence of synthetic sea water up to about 50% by volume sea water.

EXAMPLE 9

The procedure of Example 8 is repeated except that No. 1 Super diesel oil is substituted for the synthetic sea water. The results of these tests are given in Table IX below.

From Table IX it can be seen that PEG-25 hydrogenated castor oil surface active agent has reduced viscosity in the presence of oil as compared to the viscosities of the surfactant in the presence of synthetic sea water (Table VIII).

EXAMPLE 10

The procedure of Example 1 is repeated using ALFONIC ® 1412–40 surface active agent. The results of these tests are given in Table X below.

TABLE X

VISCOSITIES OF ALFONIC ® 1412-40 - SYNTHETIC SEA WATER MIXTURES

| Mixture Containing 25% by Volume Water | | | Mixture Containing 50% by Volume Water | | | Mixture Containing 75% by Volume Water | | | 100% Surface Active Agent | | |
|---|---|---|---|---|---|---|---|---|---|---|---|
| Spindle No. | RPM | Viscosity, cp | Spindle No. | RPM | Viscosity, cp | Spindle No. | RPM | Viscosity, cp | Spindle No. | RPM | Viscosity, cp |
| 5 | 0.3 | 64,000 | 5 | 0.3 | 168,000 | 3 | 3 | Extremely High | 3 | 3 | — |
| 5 | 0.6 | 52,000 | 5 | 0.6 | 104,000 | 3 | 6 | Extremely High | 3 | 6 | 20 |
| 5 | 1.5 | 38,500 | 5 | 1.5 | 76,800 | 3 | 12 | Extremely High | 3 | 12 | 30 |
| 5 | 3 | 27,600 | 5 | 3 | 83,200 | 3 | 30 | Extremely High | 3 | 30 | 36 |
| 5 | 6 | 15,000 | 5 | 6 | 59,200 | 3 | 60 | Extremely High | 3 | 60 | 42 |
| 5 | 12 | 10,000 | 5 | 12 | 45,700 | | | | | | |
| 5 | 30 | 5,400 | 5 | 30 | 29,040 | | | | | | |
| 5 | 60 | 3,460 | | | | | | | | | |

From Table X it can be seen that ALFONIC ® 1412-40 surface active agent increases in viscosity in the presence of synthetic sea water.

EXAMPLE 11

The procedure of Example 1 is repeated using ALFONIC ® 610-50 surface active agent. The results of these tests are given in Table XI below.

TABLE IX

VISCOSITIES OF VARIOUS PEG-25 HYDROGENATED CASTOR OIL - DIESEL OIL MIXTURES

| Mixture Containing 25% by Volume Diesel Oil | | | Mixture Containing 50% by Volume Diesel Oil | | | Mixture Containing Diesel Oil and Synthetic Sea Water | | | 100% Surface Active Agent | | |
|---|---|---|---|---|---|---|---|---|---|---|---|
| Spindle No. | RPM | Viscosity, cp | Spindle No. | RPM | Viscosity, cp | Spindle No. | RPM | Viscosity, cp | Spindle No. | RPM | Viscosity, cp |
| 3 | 60 | 734 | 3 | 60 | 140 | 3 | 60 | 12 | 3 | 60 | — |
| 3 | 30 | 740 | 3 | 30 | 160 | 3 | 30 | 12 | 3 | 30 | 2,600 |
| 3 | 12 | 720 | 3 | 12 | 200 | 3 | 12 | 0 | 3 | 12 | 2,700 |
| 3 | 6 | 700 | 3 | 6 | 340 | | | | 3 | 6 | 2,800 |
| 3 | 3 | 800 | 3 | 3 | 400 | | | | 3 | 3 | 2,800 |
| 3 | 1.5 | 560 | 3 | 1.5 | 400 | | | | 3 | 1.5 | 2,560 |
| 3 | 0.6 | 800 | | | | | | | 3 | 0.6 | 3,000 |
| | | | | | | | | | 3 | 0.3 | 2,800 |

TABLE XI

VISCOSITIES OF ALFONIC ® 610-50 - SYNTHETIC SEA WATER MIXTURES

| Mixture Containing 25% by Volume Water | | | Mixture Containing 50% by Volume Water | | | Mixture Containing 75% by Volume Water | | | 100% Surface Active Agent | | |
|---|---|---|---|---|---|---|---|---|---|---|---|
| Spindle No. | RPM | Viscosity, cp | Spindle No. | RPM | Viscosity, cp | Spindle No. | RPM | Viscosity, cp | Spindle No. | RPM | Viscosity, cp |
| 3 | 3 | 560 | 3 | 3 | 8,480 | 3 | 3 | — | 3 | 3 | — |
| 3 | 6 | 320 | 3 | 6 | 5,880 | 3 | 6 | 40 | 3 | 6 | 40 |
| 3 | 12 | 180 | 3 | 12 | 3,640 | 3 | 12 | 40 | 3 | 12 | 40 |
| 3 | 30 | 104 | 3 | 30 | 1,828 | 3 | 30 | 36 | 3 | 30 | 32 |
| 3 | 60 | 72 | 3 | 60 | 1,172 | 3 | 60 | 38 | 3 | 60 | 28 |

From Table XI it can be seen that ALFONIC® 610-50 surface active agent increases in viscosity in the presence of synthetic sea water up to about 50% by volume water.

EXAMPLE 12

The procedure of Example 1 is repeated using ALFONIC® 1012-60 surface active agent. The results of these tests are given in Table XII below.

TABLE XII

VISCOSITIES OF ALFONIC ® 1012-60 - SYNTHETIC SEA WATER MIXTURES

| Mixture Containing 25% by Volume Water | | | Mixture Containing 50% by Volume Water | | | Mixture Containing 75% by Volume Water | | | 100% Surface Active Agent | | |
|---|---|---|---|---|---|---|---|---|---|---|---|
| Spindle No. | RPM | Viscosity, cp | Spindle No. | RPM | Viscosity, cp | Spindle No. | RPM | Viscosity, cp | Spindle No. | RPM | Viscosity, cp |
| 3 | 3 | 120 | 3 | 3 | 840 | 3 | 3 | 2,600 | 3 | 3 | 40 |
| 3 | 6 | 100 | 3 | 6 | 380 | 3 | 6 | 2,000 | 3 | 6 | 80 |
| 3 | 12 | 70 | 3 | 12 | 310 | 3 | 12 | 1,600 | 3 | 12 | 60 |
| 3 | 30 | 68 | 3 | 30 | 160 | 3 | 30 | 1,628 | 3 | 30 | 56 |
| 3 | 60 | 78 | 3 | 60 | 148 | 3 | 60 | 1,714 | 3 | 60 | 54 |

From Table XII it can be seen that ALFONIC® 1012-60 surface active agent increases in viscosity in the presence of synthetic sea water.

EXAMPLE 13

The procedure of Example 1 is repeated using PEG-10 stearamine surface active agent. The results of these tests are given in Table XIII below.

From Table XIII it can be seen that PEG-10 stearamine surface active agent increases greatly in viscosity in the presence of synthetic sea water.

EXAMPLE 14

The procedure of Example 1 is repeated using PEG-10 oleate surface active agent. The results of these tests are given in Table XIV below.

TABLE XIV

VISCOSITIES OF PEG-10 OLEATE - SYNTHETIC SEA WATER MIXTURES

| Mixture Containing 25% by Volume Water | | | Mixture Containing 50% by Volume Water | | | Mixture Containing 75% by Volume Water | | | 100% Surface Active Agent | | |
|---|---|---|---|---|---|---|---|---|---|---|---|
| Spindle No. | RPM | Viscosity, cp | Spindle No. | RPM | Viscosity, cp | Spindle No. | RPM | Viscosity, cp | Spindle No. | RPM | Viscosity, cp |
| 3 | 3 | 4,080 | 4 | 3 | 43,600 | 3 | 3 | 4,440 | 3 | 3 | 240 |
| 3 | 6 | 2,500 | 4 | 6 | 25,100 | 3 | 6 | 3,460 | 3 | 6 | 180 |
| 3 | 12 | 1,590 | 4 | 12 | 14,000 | 3 | 12 | 3,090 | 3 | 12 | 170 |
| 3 | 30 | 876 | 4 | 30 | 6,920 | 3 | 30 | 2,360 | 3 | 30 | 152 |
| 3 | 60 | 584 | 4 | 60 | 4,340 | 3 | 60 | 1,592 | 3 | 60 | 154 |

From Table XIV it can be seen that PEG-10 oleate surface active agent increases greatly in viscosity in the presence of synthetic sea water up to about 50% by volume.

EXAMPLE 15

The procedure of Example 1 is repeated using PEG-5 cocamine surface active agent. The results of these tests are given in Table XV below.

TABLE XIII

VISCOSITIES OF PEG-10 STEARAMINE - SYNTHETIC SEA WATER MIXTURES

| Mixture Containing 25% by Volume Water | | | Mixture Containing 50% by Volume Water | | | Mixture Containing 75% by Volume Water | | | 100% Surface Active Agent | | |
|---|---|---|---|---|---|---|---|---|---|---|---|
| Spindle No. | RPM | Viscosity, cp | Spindle No. | RPM | Viscosity, cp | Spindle No. | RPM | Viscosity, cp | Spindle No. | RPM | Viscosity, cp |
| 3 | 3 | Extremely High | 3 | 3 | Extremely High | 4 | 0.3 | 1,460,000 | 3 | 0.7 | 280 |
| 3 | 6 | Extremely High | 3 | 6 | Extremely High | 4 | 0.6 | 922,000 | 3 | 1.4 | 280 |
| 3 | 12 | Extremely High | 3 | 12 | Extremely High | 4 | 1.5 | Extremely High | 3 | 2.8 | 280 |
| 3 | 30 | Extremely High | 3 | 30 | Extremely High | | | | 3 | 6.4 | 256 |
| 3 | 60 | Extremely High | 3 | 60 | Extremely High | | | | 3 | 12.6 | 252 |

TABLE XV

VISCOSITIES OF PEG-5 COCAMINE - SYNTHETIC SEA WATER MIXTURES

| Mixture Containing 25% by Volume Water | | | Mixture Containing 50% by Volume Water | | | Mixture Containing 75% by Volume Water | | | 100% Surface Active Agent | | |
|---|---|---|---|---|---|---|---|---|---|---|---|
| Spindle No. | RPM | Viscosity, cp | Spindle No. | RPM | Viscosity, cp | Spindle No. | RPM | Viscosity, cp | Spindle No. | RPM | Viscosity, cp |
| 3 | 3 | — | 3 | 3 | 400 | 3 | 3 | 280 | 3 | 3 | 160 |
| 3 | 6 | 40 | 3 | 6 | 380 | 3 | 6 | 300 | 3 | 6 | 160 |
| 3 | 12 | 50 | 3 | 12 | 320 | 3 | 12 | 300 | 3 | 12 | 160 |
| 3 | 30 | 52 | 3 | 30 | 304 | 3 | 30 | 264 | 3 | 30 | 152 |
| 3 | 60 | 50 | 3 | 60 | 294 | 3 | 60 | 260 | 3 | 60 | 160 |

From Table XV it can be seen that PEG-5 cocamine surface active agent does not increase greatly in viscosity in the presence of synthetic sea water.

EXAMPLE 16

The procedure of Example 1 is repeated using ammonium lauryl sulfate surface active agent. The results of these tests are given in Table XVI below.

TABLE XVI

VISCOSITIES OF AMMONIUM LAURYL SULFATE - SYNTHETIC SEA WATER MIXTURES

| Mixture Containing 25% by Volume Water | | | Mixture Containing 50% by Volume Water | | | Mixture Containing 75% by Volume Water | | | 100% Surface Active Agent | | |
|---|---|---|---|---|---|---|---|---|---|---|---|
| Spindle No. | RPM | Viscosity, cp | Spindle No. | RPM | Viscosity, cp | Spindle No. | RPM | Viscosity, cp | Spindle No. | RPM | Viscosity, cp |
| 3 | 3 | 80 | 3 | 3 | 300 | 3 | 3 | 680 | 3 | 3 | 800 |
| 3 | 6 | 100 | 3 | 6 | 240 | 3 | 6 | 600 | 3 | 6 | 800 |
| 3 | 12 | 80 | 3 | 12 | 230 | 3 | 12 | 540 | 3 | 12 | 780 |
| 3 | 30 | 76 | 3 | 30 | 212 | 3 | 30 | 532 | 3 | 30 | 776 |
| 3 | 60 | 80 | 3 | 60 | 210 | 3 | 60 | 526 | 3 | 60 | 786 |

From Table XVI it can be seen that ammonium lauryl sulfate surface active agent does not increase greatly in viscosity in the presence of synthetic sea water.

EXAMPLE 17

The procedure of Example 1 is repeated using sodium lauryl sulfate surface active agent. The results of these tests are given in Table XVII below.

TABLE XVII

VISCOSITIES OF SODIUM LAURYL SULFATE - SYNTHETIC SEA WATER MIXTURES

| Mixture Containing 25% by Volume Water | | | Mixture Containing 50% by Volume Water | | | Mixture Containing 75% by Volume Water | | | 100% Surface Active Agent | | |
|---|---|---|---|---|---|---|---|---|---|---|---|
| Spindle No. | RPM | Viscosity, cp | Spindle No. | RPM | Viscosity, cp | Spindle No. | RPM | Viscosity, cp | Spindle No. | RPM | Viscosity, cp |
| 3 | 3 | 80 | 3 | 3 | 160 | 3 | 3 | 360 | 3 | 3 | 400 |
| 3 | 6 | 80 | 3 | 6 | 120 | 3 | 6 | 320 | 3 | 6 | 380 |
| 3 | 12 | 60 | 3 | 12 | 80 | 3 | 12 | 240 | 3 | 12 | 340 |
| 3 | 30 | 48 | 3 | 30 | 60 | 3 | 30 | 236 | 3 | 30 | 328 |
| 3 | 60 | 56 | 3 | 60 | 66 | 3 | 60 | 216 | 3 | 60 | 318 |

From Table XVII it can be seen that sodium lauryl sulfate surface active agent does not increase in viscosity in the presence of synthetic sea water.

EXAMPLE 18

The procedure of Example 1 is repeated using coca-betaine surface active agent. The results of these tests are given in Table XVIII below.

TABLE XVIII

VISCOSITIES OF COCA-BETAINE - SYNTHETIC SEA WATER MIXTURES

| Mixture Containing 25% by Volume Water | | | Mixture Containing 50% by Volume Water | | | Mixture Containing 75% by Volume Water | | | 100% Surface Active Agent | | |
|---|---|---|---|---|---|---|---|---|---|---|---|
| Spindle No. | RPM | Viscosity, cp | Spindle No. | RPM | Viscosity, cp | Spindle No. | RPM | Viscosity, cp | Spindle No. | RPM | Viscosity, cp |
| 4 | 3 | — | 4 | 3 | 0 | 4 | 3 | Extremely High | 4 | 3 | 0 |
| 4 | 6 | — | 4 | 6 | 100 | 4 | 6 | Extremely High | 4 | 6 | 100 |
| 4 | 12 | 50 | 4 | 12 | 50 | 4 | 12 | Extremely High | 4 | 12 | 100 |
| 4 | 30 | 40 | 4 | 30 | 60 | 4 | 30 | Extremely High | 4 | 30 | 80 |
| 4 | 60 | 30 | 4 | 60 | 50 | 4 | 60 | Extremely High | 4 | 60 | 60 |

From Table XVIII it can be seen that coca-betaine surface active agent increases greatly in viscosity in the presence of synthetic sea water.

EXAMPLE 19

The procedure of Example 1 is repeated using a 50% by volume mixture of Oleth-10 and PEG-25 hydrogenated castor oil surface active agent. The results of these tests are given in Table XIX below.

TABLE XIX
VISCOSITIES OF 50% BY VOLUME MIXTURE OF OLETH-10 AND PEG-25 HYDROGENATED CASTOR OIL - SYNTHETIC SEA WATER MIXTURES

| Mixture Containing 25% by Volume Water | | | Mixture Containing 50% by Volume Water | | | Mixture Containing 75% by Volume Water | | | 100% Surface Active Agent | | |
|---|---|---|---|---|---|---|---|---|---|---|---|
| Spindle No. | RPM | Viscosity, cp | Spindle No. | RPM | Viscosity, cp | Spindle No. | RPM | Viscosity, cp | Spindle No. | RPM | Viscosity, cp |
| 4 | 3 | 440 | 4 | 3 | 22,000 | 4 | 3 | 290 | 4 | 12 | 0 |
| 4 | 6 | 350 | 4 | 6 | Extremely High | 4 | 6 | 190 | 4 | 30 | 60 |
| 4 | 12 | 120 | 4 | 12 | Extremely High | 4 | 12 | 120 | 4 | 60 | 70 |
| | | | 4 | 30 | Extremely High | 4 | 30 | 70 | | | |
| | | | | | | 4 | 60 | 50 | | | |

From Table XIX it can be seen that a 50% by volume mixture of Oleth-10 and PEG-25 hydrogenated caster oil surface active agent increases greatly in viscosity in the presence of synthetic sea water.

EXAMPLE 20

The procedure of Example 1 is repeated using a 50% by volume mixture of sodium lauryl sulfate and cocamidopropylamine oxide surface active agent. The results of these tests are given in Table XX below.

TABLE XX
VISCOSITIES OF A 50% BY VOLUME MIXTURE OF SODIUM LAURYL SULFATE AND COCAMIDOPROPYLAMINE OXIDE - SYNTHETIC SEA WATER MIXTURES

| Mixture Containing 25% by Volume Water | | | Mixture Containing 50% by Volume Water | | | Mixture Containing 75% by Volume Water | | | 100% Surface Active Agent | | |
|---|---|---|---|---|---|---|---|---|---|---|---|
| Spindle No. | RPM | Viscosity, cp | Spindle No. | RPM | Viscosity, cp | Spindle No. | RPM | Viscosity, cp | Spindle No. | RPM | Viscosity, cp |
| 4 | 3 | 54,000 | 4 | 3 | Extremely High | 4 | 3 | Extremely High | 4 | 3 | Extremely High |
| 4 | 6 | 35,000 | 4 | 6 | Extremely High | 4 | 6 | Extremely High | 4 | 6 | Extremely High |
| 4 | 12 | 19,000 | 4 | 12 | Extremely High | 4 | 12 | Extremely High | 4 | 12 | Extremely High |
| 4 | 30 | 8,000 | 4 | 30 | Extremely High | 4 | 30 | Extremely High | 4 | 30 | Extremely High |
| 4 | 60 | 4,000 | 4 | 60 | Extremely High | 4 | 60 | Extremely High | 4 | 60 | Extremely High |

From Table XX it can be seen that a 50% by volume mixture of sodium lauryl sulfate and cocamidopropylamine oxide surface active agent increases greatly in viscosity in the presence of synthetic sea water.

EXAMPLE 21

The procedure of Example 1 is repeated using a 50% by volume mixture of lauryl betaine and ammonium lauryl sulfate surface active agent. The results of these tests are given in Table XXI below.

TABLE XXI
VISCOSITIES OF A 50% BY VOLUME MIXTURE OF LAURYL BETAINE AND AMMONIUM LAURYL SULFATE - SYNTHETIC SEA WATER MIXTURES

| Mixture Containing 25% by Volume Water | | | Mixture Containing 50% by Volume Water | | | Mixture Containing 75% by Volume Water | | | 100% Surface Active Agent | | |
|---|---|---|---|---|---|---|---|---|---|---|---|
| Spindle No. | RPM | Viscosity, cp | Spindle No. | RPM | Viscosity, cp | Spindle No. | RPM | Viscosity, cp | Spindle No. | RPM | Viscosity, cp |
| 4 | 3 | 400 | 4 | 3 | 200 | 4 | 3 | 7,400 | 4 | 3 | 4,000 |
| 4 | 6 | 400 | 4 | 6 | 200 | 4 | 6 | 4,700 | 4 | 6 | 3,200 |
| 4 | 12 | 200 | 4 | 12 | 150 | 4 | 12 | 2,850 | 4 | 12 | 2,100 |
| 4 | 30 | 100 | 4 | 30 | 120 | 4 | 30 | 1,540 | 4 | 30 | 2,640 |
| 4 | 60 | 120 | 4 | 60 | 90 | 4 | 60 | 910 | 4 | 60 | 2,050 |

From Table XXI it can be seen that a 50% by volume mixture of lauryl betaine and ammonium lauryl sulfate surface active agent increases greatly in viscosity in the presence of synthetic sea water.

The embodiments of the invention in which an inclusive property or privilege is claimed are defined as follows:

1. A method of inhibiting the flow of water in a subterranean formation comprising introducing a gelling agent into said formation having the property of forming a highly viscous gel in the presence of water, wherein said gelling agent is a surface active agent selected from the group consisting of ethoxylated alcohols, ethoxylated aliphatics, amido betaines, polyoxyethylene oleyl ether, polyoxyethylene 20 sorbitan mono-oleate, and polyoxyethylene fatty glyceride and mixtures of such agents.

2. The method of claim 1 wherein said gelling agent is selected from the group consisting of ethoxylated surface active agents and mixtures of such agents.

3. The method of claim 2 wherein said gelling agent is a 50% by volume mixture of polyoxyethylene oleyl ether, and polyoxyethylene fatty glyceride.

4. The method of claim 1 wherein said gelling agent is polyoxyethylene oleyl ether.

5. A method of inhibiting the flow of water into a wellbore penetrating a water bearing subterranean formation comprising injecting into said water bearing subterranean formation a gelling agent having the property of forming a highly viscous gel in the presence of water whereby such gel is formed in said formation and the flow of water from said formation into said wellbore is blocked thereby, wherein said gelling agent is a surface active agent selected from the group consisting of ethoxylated alcohols, ethoxylated aliphatics, amido betaines, polyoxyethylene oleyl ether, polyoxyethylene 20 sorbitan mono-oleate, and polyoxyethylene fatty glyceride and mixtures of such agents.

6. The method of claim 5 wherein said gelling agent is selected from the group consisting of ethoxylated surface active agents and mixtures of such agents.

7. The method of claim 6 wherein said gelling agent is a 50% by volume mixture of polyoxyethylene oleyl ether and polyoxyethlene fatty glyceride.

8. The method of claim 6 wherein said gelling agent is injected into said formation by displacement therein with a fluid in which the gelling agent is of limited solubility.

9. The method of claim 8 wherein said gelling agent is displaced into said formation with a fluid selected from the group consisting of liquid hydrocarbons, glycols, and natural oils.

10. The method of claim 5 wherein said gelling agent is polyoxyethylene oleyl ether.

11. A method of inhibiting the flow of water from one or more subterranean formations containing both water and oil comprising introducing a gelling agent into said formation having the property of forming a highly viscous gel in the presence of water but reducing in viscosity in the presence of oil, wherein said gelling agent is a surface active agent selected from a group consisting of ethoxylated alcohols, ethoxylated aliphatics, amido betaines, polyoxyethylene oleyl ether, polyoxyethylene 20 sorbitan mono-oleate, and polyoxyethylene fatty glyceride and mixtures of such agents.

12. The method of claim 11 wherein said gelling agent is selected from a group consisting of ethoxylated surface active agents and mixtures of such agents.

13. The method of claim 12 wherein said gelling agent is a 50% by volume mixture of polyoxyethylene oleyl ether and polyoxyethylene fatty glyceride.

14. The method of claim 12 wherein said gelling agent is introduced into said formation by displacement therein with a fluid in which the gelling agent is of limited solubility.

15. The method of claim 14 wherein said gelling agent is displaced into said formation with a fluid selected from the group consisting of liquid hydrocarbons, glycols, and natural oils.

16. The method of claim 11 wherein said gelling agent is polyoxyethylene oleyl ether.

* * * * *